Feb. 25, 1936.  J. E. SIMEK  2,031,861
SWITCH BOX LATH CLAMP
Filed Jan. 28, 1935
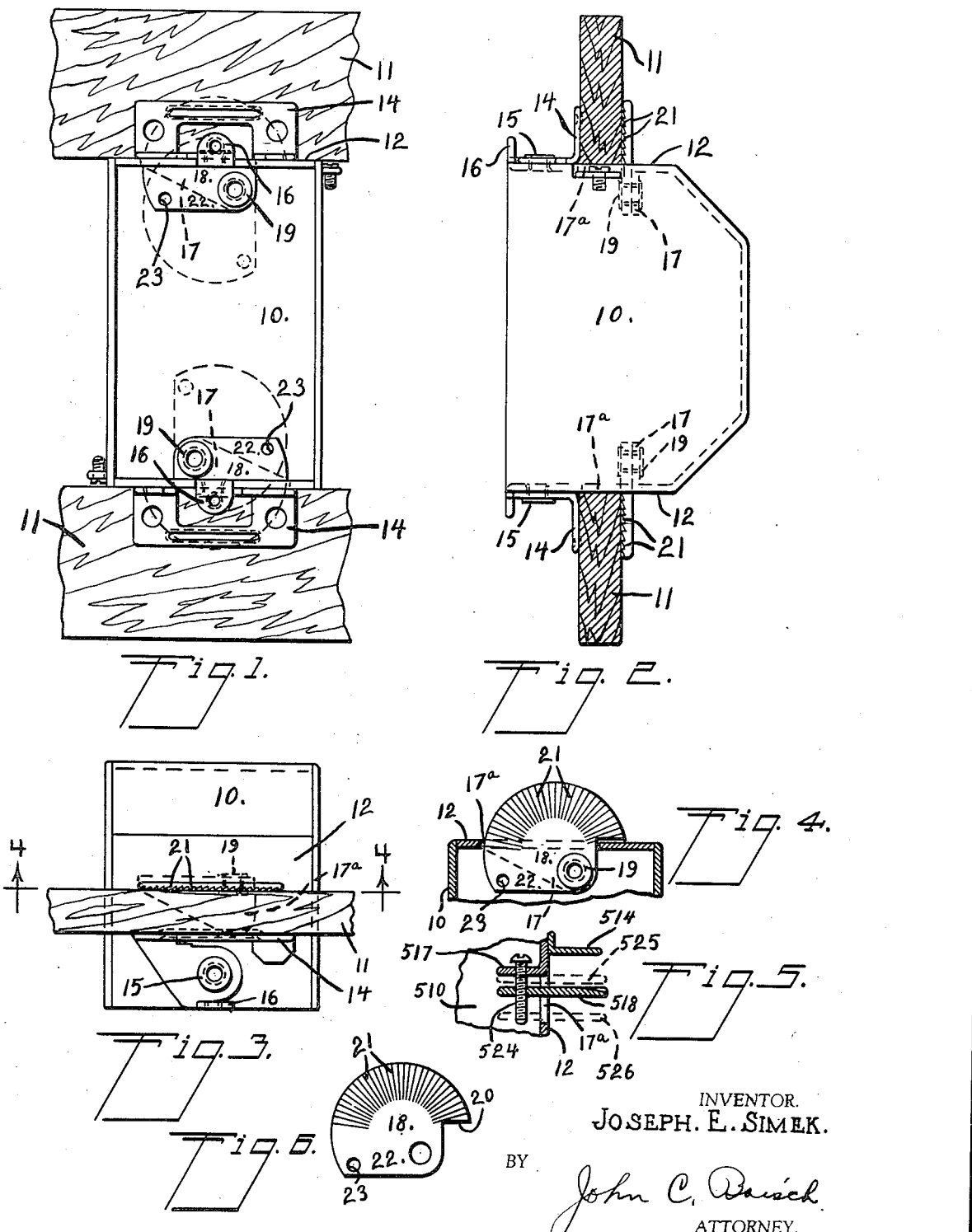
INVENTOR.
JOSEPH. E. SIMEK.
BY
John C. Dausch
ATTORNEY.

Patented Feb. 25, 1936

2,031,861

UNITED STATES PATENT OFFICE 2,031,861

SWITCH BOX LATH CLAMP

Joseph E. Simek, Omaha, Nebr.

Application January 28, 1935, Serial No. 3,816

2 Claims. (Cl. 247—21)

Electric switch boxes of the type now generally used in walls and the like are set in an opening cut in the lath of the wall and are fit snugly in said opening. Boxes of the conventional type are provided with flanges having holes therein and screws are used in the holes to secure the box to the lath. Switch boxes thus secured frequently work loose and cause trouble due to the screws being driven into lath which are of comparatively thin, light and soft wood. Said screws often split the lath or work loose. The box will then become loose and is likely to cause trouble. Boxes thus secured also require considerable time and effort to install.

It is therefore the object of my invention to provide means for securely clamping switch boxes to lath without the use of screws or the like and which will not split or destroy the lath or allow the box to become loose.

Another object of my invention is to provide clamping means of the character mentioned whereby the box may be releasably secured to the lath with a minimum of time and effort.

Further objects of my invention relate to structural details for attaining simplicity of construction, inexpensiveness of manufacture, and durability.

Other objects of my invention will appear in the following detailed description taken in connection with the accompanying drawing wherein:

Figure 1 is a front view of a switch box secured to laths of a wall and embodying my invention.

Figure 2 is a side view of the same.

Figure 3 is a plan view of same.

Figure 4 is a partial section taken on line 4—4 of Figure 3.

Figure 5 is a partial section of a modified form of my invention.

Figure 6 is a front view of the clamping member of my device.

Referring more particularly to the drawing reference numeral 10 indicates a switch box generally, set between laths 11 of a wall. The box has upper and lower end portions 12 fitting snugly against the respective adjacent laths 11, and each of said end portions is provided with an outwardly and laterally extending flange 14 secured thereto by an eyelet or rivet 15. An outwardly extending ear 16 is provided adjacent the forward edge of each end portion 12 and has a threaded opening therein for receiving a screw to hold the face plate thereto. Each end is provided with a triangular flange 17 which is stamped from the respective end portions and each flange is inturned. In stamping and turning in the flanges slots 17a are formed in the ends adjacent to and parallel with the outwardly extending flanges 14, said slots being rearwardly of said flanges. Each inturned flange 17 has a clamping member 18 pivotally mounted on the front side thereof with an eyelet 19. Solid rivets or screws or the like may also be used to secure the clamp members to the flanges 17. Each clamp member is partly annular in shape and is adapted to be pivotally moved outwardly through its respective slots. The outward pivotal movement of said clamp members is limited by shoulders 20 adapted to abut against the outer sides of the respective end portions. Radially cut, annularly spaced teeth 21 are provided on the clamp members and are adapted to permit said members to be easily moved into clamping position and which will resist movement in the opposite direction. The clamp members may be forcibly moved out of clamping association with the flange 14 against the resistance of the teeth 21 but said teeth will prevent the clamp members from moving out of clamping position from vibration or jars which the box may be subjected to from working of the switch or from other causes. Each clamping member is also provided with a tab 22 against the radial edge of which pressure may be exerted to move the clamp member into clamping position and which may be suitably grasped to forcibly move the member out of clamping association with the flange 14 should it be desired to remove the box. The tab has a hole 23 into which the point of a suitable instrument such as a small screw driver may be inserted to positively engage the clamp member for pivotally moving same.

In the modified embodiment of my invention shown in Figure 5 reference numeral 510 indicates the box, 514 the outwardly extending flange, 517 the inturned flange, and 518 the clamping member. A screw 524 received in an unthreaded opening in the flange 517 and threadably received in the clamp member 518 at its pivotal center, provides a pivot on which said clamp member may be pivotally moved and by which said member 518 may be drawn tightly against a lath between said member 518 and the flange 514. Means is thereby provided whereby the switch box may be secured to laths or the like of various thickness. The dotted lines 525 and 526 indicate the clamping member at its extreme limits of longitudinal movement on the screw 524.

While I have shown the switch box clamped to laths it is to be understood that it may be secured in other types of walls in which switch boxes of conventional type may be secured.

It is also to be understood that the invention may be constructed in other manners and the parts associated in other relations, and therefore, I do not desire to be limited in any manner except as set forth in the claims hereunto appended.

Having thus described my invention what I claim is:

1. In a switch box lath clamp, a switch box, an outwardly extending flange on the switch box, said box having a slot adjacent to and parallel with said flange, an inwardly extending flange along one edge of said slot, and a clamping member pivotally mounted on the inwardly extending flange and adapted to be moved pivotally outward through the slot in spaced relation with the outwardly extending flange.

2. In a switch box lath clamp, a switch box having an outwardly and laterally extending flange and a slot adjacent to and parallel with said flange, an inwardly extending flange adjacent to the slot, a clamping member pivotally mounted on the inwardly extending flange and adapted to be moved pivotally outward through the slot in spaced relation with the outwardly extending flange, and a shoulder on said clamping member adapted to engage an adjacent portion of the box and limit the outward pivotal movement of said clamping member.

JOSEPH E. SIMEK.